United States Patent
Ko et al.

(10) Patent No.: US 6,770,696 B1
(45) Date of Patent: Aug. 3, 2004

(54) PREPARATION OF CLAY-DISPERSED POLYMER NANOCOMPOSITE

(75) Inventors: Moon Bae Ko, Seoul (KR); Bum Suk Jung, Seoul (KR); Won Ho Jo, Kyoungki-do (KR); Seong Woo Kim, Cheju-do (KR); Moo Sung Lee, Seoul (KR); Jun Kyung Kim, Seoul (KR); Soon Ho Lim, Seoul (KR); Chul Rim Choe, Kyoungki-do (KR); Min Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 136 days.

(21) Appl. No.: 10/069,617
(22) PCT Filed: Oct. 24, 2000
(86) PCT No.: PCT/KR00/01205
§ 371 (c)(1),
(2), (4) Date: Feb. 27, 2002
(87) PCT Pub. No.: WO02/20646
PCT Pub. Date: Mar. 14, 2002

(30) Foreign Application Priority Data

Sep. 6, 2000  (KR) ........................................ 2000-52689

(51) Int. Cl.$^7$ ................................................ C08K 3/34
(52) U.S. Cl. ....................... 524/445; 524/186; 524/447; 501/145; 501/148
(58) Field of Search ............................... 524/186, 445, 524/447

(56) References Cited

U.S. PATENT DOCUMENTS

| | | | | |
|---|---|---|---|---|
| 6,034,163 A | * | 3/2000 | Barbee et al. | 524/445 |
| 6,060,549 A | * | 5/2000 | Li et al. | 524/445 |
| 6,384,121 B1 | * | 5/2002 | Barbee et al. | 524/445 |
| 6,395,386 B2 | * | 5/2002 | Bagrodia et al. | 428/323 |
| 6,486,252 B1 | * | 11/2002 | Barbee et al. | 524/445 |

OTHER PUBLICATIONS

Pantooustier, N. et al. Poly(e–caprolactone) layered silicate nanocomposite: effect of clay surface modifiers on the melt intercalation, e–polymers Aug. 2001, No. 009 [http://www.e-polymers.org/papers/dubois_070801.pdf].*

* cited by examiner

*Primary Examiner*—Edward J. Cain
*Assistant Examiner*—Katarzyna Wyrozebski
(74) *Attorney, Agent, or Firm*—Rosenberg, Klein & Lee

(57) ABSTRACT

Disclosed is a method for preparing a clay-dispersed polymer nanocomposite. In this method, a polymer, which carries oxygen atoms within the repeating units of its backbone and is thermodynamically compatible with a binder resin, is used as a matrix resin. Useful is poly($\epsilon$-caprolactone) owing to its thermodynamic compatibility with poly(styrene-co-acrylonitrile)copolymers, poly(acrylonitrile-co-butadiene-co-styrene) copolymers, and poly(vinylchloride) resins. Poly($\epsilon$-caprolactone) resins aid the binder resins to penetrate into silicate layers so that the silicate of the organophilic clay was completely delaminated to silicate lamellas.

15 Claims, 3 Drawing Sheets

PREPARATION OF CLAY-DISPERSED POLYMER NANOCOMPOSITE

TECHNICAL FIELD

The present invention relates, in general, to a method for the preparation of a clay-dispersed polymer nanocomposite and, more particularly, to the use of an oxygen atom-carrying polymer with thermodynamical compatibility with a binder resin in preparing a clay-dispersed polymer nanocomposite, thus delaminating clay completely to silicate lamellas.

PRIOR ART

With the aim of overcoming limited physical properties of general-purpose plastics, the techniques for preparing clay-dispersed organic/inorganic composites are characterized in that clay ores of silicate layered structures are delaminated into silicate layers at nano levels and the silicate layers are dispersed in polymer resins, thereby upgrading general-purpose plastics to engineering plastics. Silicate layer, a structural unit of clay, is however difficult to disperse in polymer resins owing to its strong van der Waals attraction. To circumvent this problem, intercalants are suggested. According to a compounding technique, for example, an intercalant with a low molecular weight is introduced into the silicate layered structure to aid the penetration of polymer resins into the structure, thereby delaminating clay ores and dispersing the silicate layers in the resins.

However, the conventional compounding technique has such a problem that, when nanocomposites are prepared from some resins, including poly(styrene-co-acrylonitrile) copolymer resins, poly(acrylonitrile-co-butadiene-co-styrene) copolymer resins, and poly(vinylchloride) resins, it is virtually impossible to completely delaminate clay ores to the extent of a silicate layer, which is a structural unit of clay. In the nanocomposites of such resins, prepared by the conventional compounding technique, in fact, there are observed blocks of nano scales, which result from the aggregation of several to tens silicate lamellas [see, *Korea Polymer Journal*, 7, 310 (1999); *ibid*, 8, 95 (2000); *ibid*, 8, 120 (2000)]. The reason is that a nitrogen and a chlorine atom, which are contained in the repeating unit acrylonitrile of poly(styrene-co-acrylonitrile) or poly(acrylonitrile-co-butadiene-co-styrene) copolymer resins and the repeating unit vinyl chloride of poly(vinylchloride) resin, respectively, is smaller in electronegativity than is an oxygen atom, which is present within organophilic clay, so that it is not easy for the polymer chain to penetrate between silicate layers.

DISCLOSURE OF THE INVENTION

Leading to the present invention, the intensive and thorough research on the preparation of clay-dispersed polymer nanocomposites, conducted by the present inventors, resulted in the finding that a polymer carrying oxygen atoms can itself penetrate into silicate structures and, when constituting a matrix for the composites, along with other polymers, help penetrate the binder resins into layered structure of silicates if they are thermodynamically compatible with the oxygen-carrying polymer.

Therefore, it is an object of the present invention to overcome the above problems encountered in prior arts and to provide a method for the preparation of clay-dispersed polymer nanocomposites, in which clay ores are completely delaminated to a silicate layer, which is a constituent minimum unit.

Based on the present invention, the object could be accomplished by a provision of a method for preparing a clay-dispersed polymer nanocomposite, which comprises introducing an oxygen-carrying polymer, alone or in combination with a thermodynamically compatible resin, as a matrix resin.

BEST MODES FOR CARRYING OUT THE INVENTION

Figure 1A:
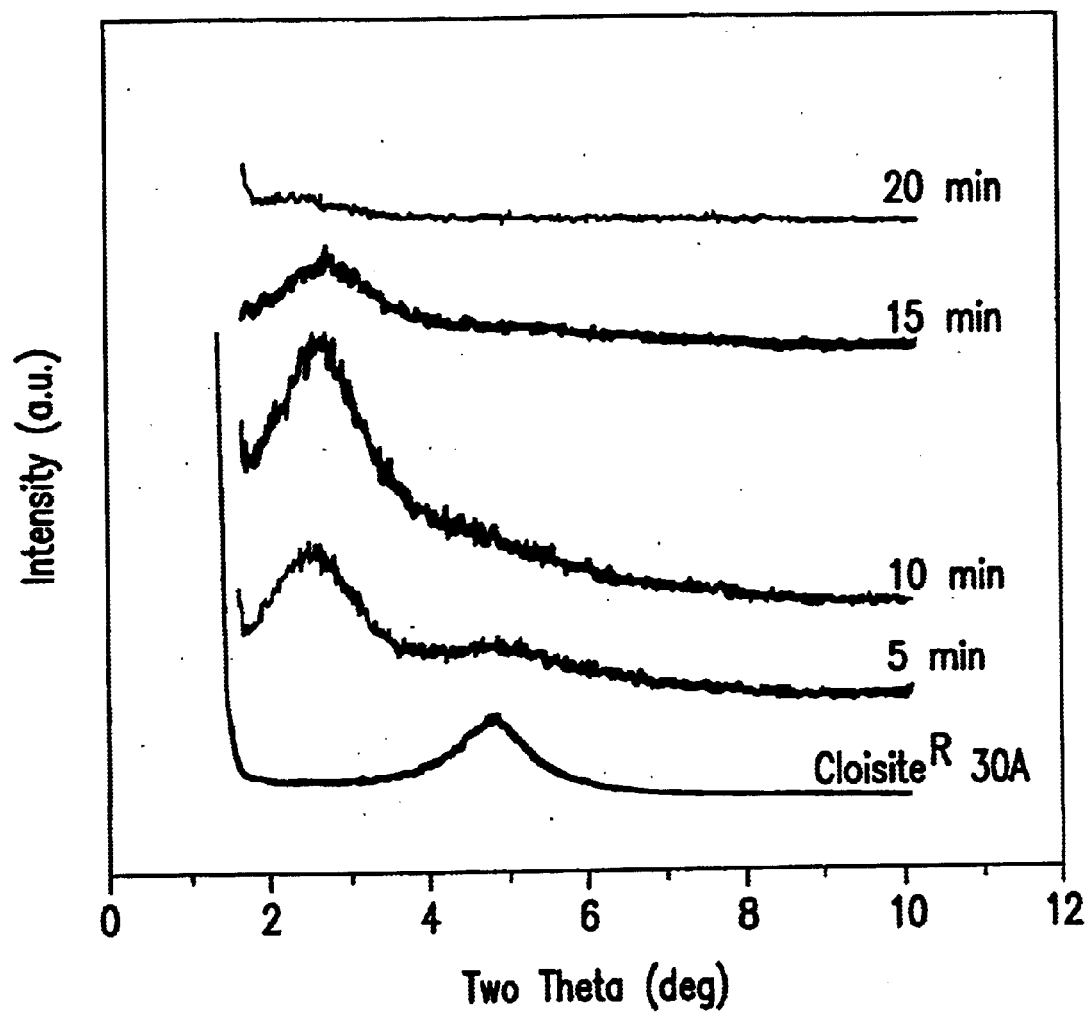
FIG. 1a shows X-ray diffraction spectra of the nanocomposites of the present invention according to mixing periods of time.

The present invention pertains to a compounding technique of preparing a clay-dispersed polymer nanocomposite, in which a matrix resin, including a poly(styrene-co-acrylonitrile)copolymer, poly(acrylonitrile-co-butadiene-co-styrene) copolymer or poly(vinylchloride), is inserted into silicate structures with the aid of an intercalant, characterized in that a poly($\epsilon$-caprolactone) polymer is used.

Poly($\epsilon$-caprolactone) carries oxygen atoms within the repeating units of its backbone, as well as being thermodynamically compatible with poly(styrene-co-acrylonitrile) copolymer, poly(acrylonitrile-co-butadiene-co-styrene) copolymer and poly(vinylchloride).

Useful in the present invention is a poly($\epsilon$-caprolactone) resin ranging, in molecular weight, from 10,000 to 100,000.

It is preferable that poly($\epsilon$-caprolactone) is used at an amount of 20–40% by weight based on the total weight of the nanocomposite. For instance, if poly($\epsilon$-caprolactone) is added at an amount less than 20% by weight, its compatibilization effect is too weak to bring about complete delamination into clay. On the other hand, more than 40% by weight of poly($\epsilon$-caprolactone) may shield the expression of characteristic physical properties of other matrix resins.

In the present invention, clay to be dispersed in the matrix is treated with an intercalant in order to increase the dispersity of clay. The intercalant is preferably selected from the group consisting of hydroxyethylmethyloctadecylammonium chloride, which is represented by the following chemical formula 1; amines such as octyl amine, decyl amine, dodecyl amine, hexadecyl amine, and octadecyl amine, which are represented by the following chemical formula 2; and secondary amines represented by the following chemical formula 3:

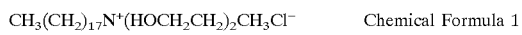

$CH_3(CH_2)_{17}N^+(HOCH_2CH_2)_2CH_3Cl^-$   Chemical Formula 1

$CH_3(CH_2)_{n-1}NH_2$   Chemical Formula 2 wherein n is 8, 10, 12, 16 or 18.

$CH_3(CH_2)_{n-1}NHR$   Chemical Formula 3 wherein n is an integer of 8–18 and R is a hydrocarbon.

As a constituent for clay, montmorillonite, which swells in water, is preferably used.

Besides the polymer resins mentioned above, any of the resins which are thermodynamically compatible with poly (ε-caprolactone) can be used in the present invention. Chlorinated polyethylene is an example of the thermodynamically compatible resins.

Preparation of clay-dispersed polymer nanocomposites according to the present invention can be achieved in either a one-pot or a two-pot manner.

As for the one-pot manner, it is conducted by mixing a binder resin, poly(ε-caprolactone), and organophilic clay and extruding them together. On the other hand, according to the two-pot manner, poly(ε-caprolactone) is mixed or extruded with an organophilic clay to give a master batch, followed by mixing with a binder resin for extrusion.

The following examples are set forth to illustrate more clearly the principles and practice of this invention to one skilled in the art. As such, they are not intended to limit the invention, but are illustrative of certain preferred embodiments.

EXAMPLE 1

Preparation of Poly(ε-caprolactone) Nanocomposite

An organophilic clay, such as that manufactured from Southern Clay Products Inc. U.S.A., identified as Closite 30A, was dry-blended at an amount of 5% by weight with poly(ε-caprolactone) with a molecular weight of 80,000 at 100° C. at 120 rpm in a Minimax molder for various periods of time to obtain nanocomposites.

Figure 1B:
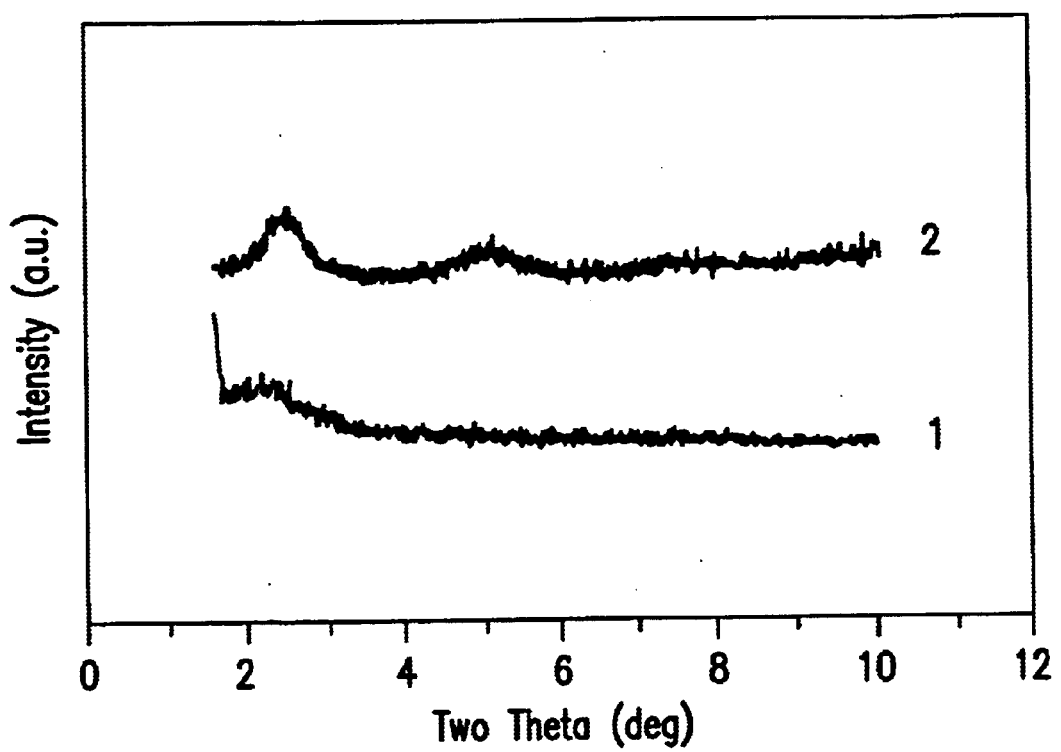
FIG. 1b shows an X-ray spectrum of the clay-dispersed poly(styrene-co-acrylonitrile)copolymer nanocomposite according to the present invention, along with that of the clay-dispersed poly($\epsilon$-caprolactone) nanocomposite.

With reference to FIG. 1$a$, there are shown X-ray diffraction spectra of nanocomposites according to mixing periods of time. As seen in the spectra, the X-ray diffraction peak at around 2.5° disappears from the spectrum of the nanocomposite obtained when the mixing was continued for 20 min or longer; thus the silicate was completely delaminated with the aid of the intercalant in the nanocomposite.

EXAMPLE 2

Preparation of Clay-dispersed Poly(styrene-co-acrylonitrile)copolymer Nanocomposite Using Clay-dispersed Poly(ε-caprolactone) Nanocomposite The clay-dispersed poly(ε-caprolactone) nanocomposite prepared in Example 1 was mixed at a weight ratio of 2:3 with a poly(styrene-co-acrylonitrile)copolymer resin, after which blending of the mixture was carried out at 100° C. for 5 min in a Minimax molder at 120 rpm to afford a clay-dispersed poly(styrene-co-acrylonitrile)copolymer nanocomposite.

With reference to FIG. 1$b$, an X-ray spectrum of this clay-dispersed poly(styrene-co-acrylonitrile)copolymer nanocomposite is shown, along with that of the clay-dispersed poly(ε-caprolactone) nanocomposite. In the X-ray spectrum of the nanocomposite of interest, an X-ray diffraction peak is detected at around 2.5°, but its intensity is very weak, indicating that organophilic clay is significantly dispersed.

EXAMPLE 3

Preparation of Clay-dispersed Poly(ε-caprolactone) Nanocomposite Through Twin-screw Extruder and Preparation of Poly(acrylonitrile-co-butadiene-co-styrene) Copolymer Nanocomposite Using Master Batch Comprising the Same An organophilic clay, such as that manufactured by Southern Clay Products Inc., U.S.A., identified as Closite 30A, was dry-blended at an amount of 10% by weight with poly(ε-caprolactone) with a molecular weight of 80,000 and the blend was extruded through a twin-screw extruder at 100° C. at 250 rpm to give a nanocomposite in which the silicate of the organophilic clay was completely delaminated to silicate layers. After being pelletized, the clay-dispersed poly(ε-caprolactone) nanocomposite was blended at a weight ratio of 1:2 with a poly(acrylonitrile-co-butadiene-co-styrene) copolymer, followed by extruding the blend through a twin-screw extruder to produce a clay-dispersed poly(acrylonitrile-co-butadiene-co-styrene) copolymer nanocomposite.

EXAMPLE 4

One Pot-Type Preparation of Clay-Dispersed Poly(styrene-co-acrylonitrile) Nanocomposite Through Twin-Screw Extruder With a matrix in which a poly(ε-caprolactone) with a molecular weight of 10,000 was contained at an amount of 30% by weight with the remaining portion being a poly(styrene-co-acrylonitrile)copolymer, Closite 30A, an organophilic clay commercially available from Southern Clay Products Inc., U.S.A., was dry-blended at an amount of 5% by weight. At various temperatures (220, 200, 180, 160 and 140° C.), the resulting blend was extruded through a twin-screw extruder at 250 rpm to produce nanocomposites.

Figure 2:
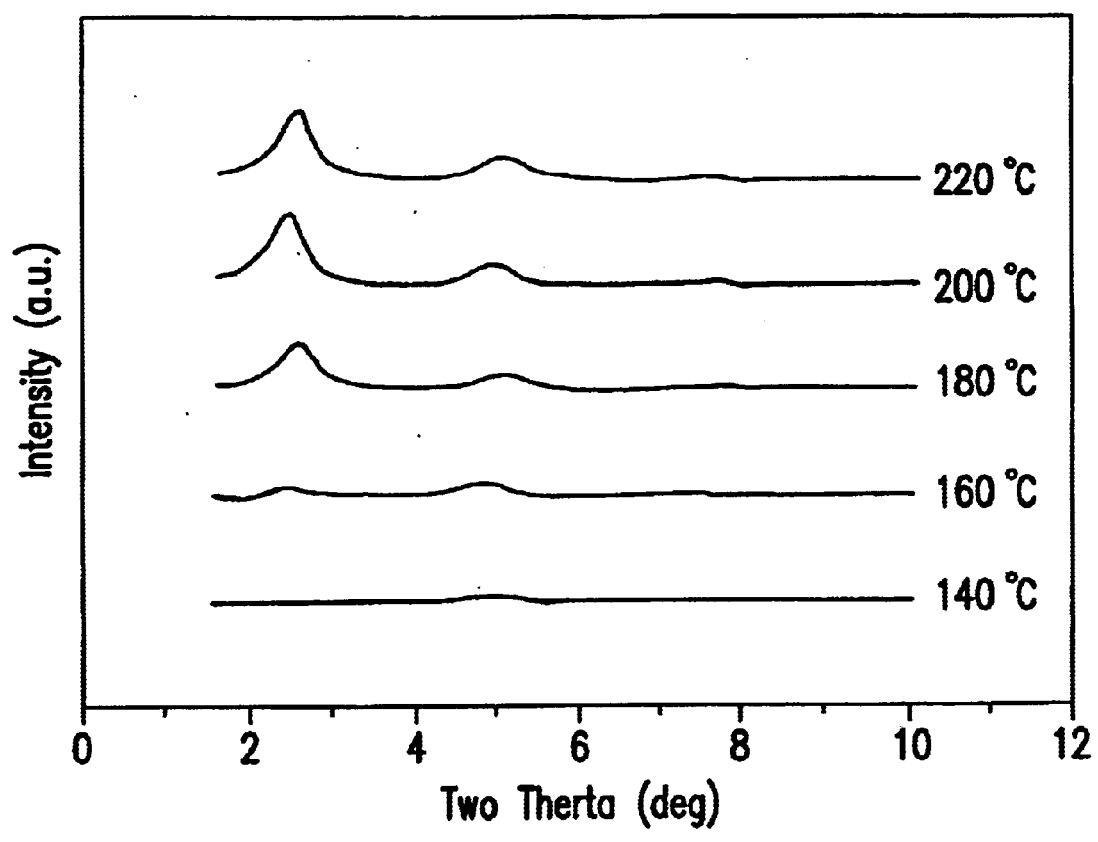
FIG. 2 shows X-ray diffraction spectra of the nanocomposites prepared at various temperatures according to the method of the present invention.

FIG. 2 shows X-ray diffraction spectra of the nanocomposites prepared at various temperatures. As apparent from these spectra data, the clay-dispersed organic/inorganic nanocomposite is made of completely delaminated silicate layers, which are constituent minimum units, when being extruded at 140° C., but contained clay nanoblocks when being extruded at 220° C.

EXAMPLE 5

Preparation of Organophilic Clay from Octadecylamine and Preparation of Clay-dispersed Poly(styrene-co-acrylonitrile)copolymer Nanocomposite Using the Same In a 3,000 ml beaker were charged 1,500 ml of deionized water, 8.1 g of octadecylamine and 3.0 ml of hydrochloric acid and the solution was heated to 80° C. with stirring (Solution A). 1,500 ml of deionized water and 30 g of clay, such as that manufactured by Kunimine Co. Japan, identified as Kunifia F, were added into another 3,000 ml beaker and heated to 80° C. This clay dispersion was poured to the Solution A and stirred for 1 hour, after which a white precipitate was separated by filtration. After being washed with distilled water maintained at 80° C., the precipitate was dried to give 32.1 g of organophilic clay. This was ball-milled to obtain a powder (C18-MONT) with a size of 50 μm. Based on data of X-ray diffraction tests, the space between silicate lamellas was calculated to be 19 Å. The nanocomposite was measured to comprise 74.0% by weight of the content of pure clay as measured by thermo gravimetric analysis. Taken together, the X-ray diffraction data and the thermo gravimetric analysis data demonstrate that the clay has been transformed to organophilic clay.

To a polymer matrix in which poly(ε-caprolactone) with a molecular weight of 10,000 was blended at an amount of 30% by weight with a poly(styrene-co-acrylonitrile) copolymer, the above organophilic clay (C18-MONT) was added at an amount of 5% by weight and dry-blended. The resulting blend was extruded at 160° C. at 250 rpm to give a clay-dispersed poly(styrene-co-acrylonitrile)copolymer nanocomposite in which the silicate of the organophilic clay was completely delaminated to silicate layers.

EXAMPLE 6

One Pot-type Preparation of Clay-Dispersed Poly (acrylonitrile-co-butadiene-co-styrene) Copolymer Nanocomposite Using Twin-screw Extruder To a polymer matrix in which poly($\epsilon$-caprolactone) with a molecular weight of 10,000 was blended at an amount of 30% by weight with a poly(acrylonitrile-co-butadiene-co-styrene) copolymer, organophilic clay, such as that manufactured by Southern Clay Products Inc. U.S.A., identified as Closite® 30A, was added at an amount of 5% by weight and dry-blended. The resulting blend was extruded at 160° C. at 250 rpm to give a clay-dispersed poly(acrylonitrile-co-butadiene-co-styrene) copolymer nanocomposite in which the silicate of the organophilic clay was completely delaminated to silicate layers.

EXAMPLE 7

One Pot-type Preparation of Clay-Dispersed Poly (vinylchloride) Copolymer Nanocomposite Using Single-Screw Extruder To a polymer matrix in which poly($\epsilon$-caprolactone) with a molecular weight of 10,000 was blended at an amount of 30% by weight with a poly(vinylchloride) polymer, organophilic clay, such as that manufactured by Southern Clay Products Inc. U.S.A., identified as Closite 30A, was added at an amount of 5% by weight and dry-blended. The resulting blend was extruded at 160° C. at 250 rpm through a single-screw extruder to give a clay-dispersed poly (vinylchoride) polymer nanocomposite in which the silicate of the organophilic clay was completely delaminated to silicate layers.

INDUSTRIAL APPLICABILITY

Over the used polymers themselves, the clay-dispersed polymer nanocomposites according to the present invention were measured to be improved by 30–50% in elastic modulus, by 5–10% in mechanical properties, and by 50° C. in heat deflection temperature. With these advantages, the nanocomposites according to the present invention can replace conventional ABS resin and various PVC resins for use in housing electronic appliances.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparation of a clay-dispersed polymer nanocomposite, which comprises the steps of:
   dry mixing poly($\epsilon$-caprolactone) polymer with thermodynamically compatible resin, as a matrix resins;
   dry mixing a clay and extruding said clay-dispersed polymer nanocomposite,
   wherein clay is delaminated in said nanocomposite.

2. The method as set forth in claim 1, wherein the thermodynamically compatible resin is a chlorinated polyethylene or poly(vinyl chloride) and the temperature is about 160 degrees Centigrade.

3. The method as set forth in claim 1, wherein the thermodynamically compatible resin is selected from the group consisting of a poly(styrene-co-acrylonitrile copolymer, a poly(acrylonitrile-co-butadiene-co-styrene) copolymer, and a poly(vinyl chloride) and the temperature is about 160 degrees Centigrade.

4. The method as set forth in claim 1, wherein the poly($\epsilon$-caprolactone) ranges, in weight average molecular weight, from 10,000 to 100,000.

5. The method as set forth in claim 1, wherein the poly($\epsilon$-caprolactone) is dry mixed with a thermodynamically compatible resin, along with an intercalant, and extruded, said thermodynamically compatible resin being selected from the group consisting of a poly(styrene-co-acrylonitrile) copolymer, a poly(acrylonitrile-co-butadiene-co-styrene) copolymer, and a poly(vinyl chloride).

6. The method as set forth in claim 1, wherein the clay-dispersed polymer nanocomposite comprises clay which is intercalated with an intercalant.

7. The method as set forth in claim 6, wherein the intercalant is selected from the group consisting of hydroxyethylmethyloctadecylammonium chloride, represented by the following chemical formula 1;

$$CH_3(CH_2)_{17}N^+(HOCH_2CH_2)_2CH_3Cl \qquad \text{Chemical Formula 1}$$

amines, represented by the following chemical formula 2;

$$CH_3(CH_2)_{n-1}NH_2 \qquad \text{Chemical Formula 2}$$

wherein n is 8, 10, 12, 16 or 18.

and, secondary amines represented by the following chemical formula 3:

$$CH_3(CH_2)_{n-1}NHR \qquad \text{Chemical Formula 3}$$

wherein n is an integer of 8–18 and R is a hydrocarbon.

8. The method as set forth in claim 1, wherein the clay-dispersed polymer composite comprises montmorillonite.

9. The method as set forth in claim 1, wherein the amount of poly($\epsilon$-caprolactone) used is in the range of 20–40% by weight based on the total weight of the nanocomposite.

10. The method as set forth in claim 1, wherein the temperature is in a range of about 100 degrees Centigrade to about 180 degrees Centigrade.

11. The method as set forth in claim 1, wherein the amount of clay is in the range of 5% to 10% by weight.

12. The method as set forth in claim 1, wherein the amount of thermodynamically compatible resin is in the range of 30% to 60% by weight.

13. The method as set forth in claim 1, wherein the amount of poly ($\epsilon$-caprolactone) polymer is in the range of 10% to 95% by weight.

14. A method for preparation of clay nanocomposite comprising steps wherein a poly($\epsilon$-caprolactone) is dry mixed with an organophilic clay to give a masterbatch, and then, dry blended with a thermodynamically compatible resin and extruded.

15. A method for the preparation of a clay-dispersed polymer nanocomposite, which comprises the steps of:
    introducing a predetermined amount in the range of 10% to 95% by weight of a poly($\epsilon$-caprolactone) polymer with weight-average molecular weight in the range of 10,000 to 100,000;

dry blending with amount of a polymer in the range of 10% to 95% by weight, and chosen from the group consisting of poly(styrene-co-acrylonitrile) copolymer, poly(vinylchloride), chlorinated polyethylene and poly(acrylonitrile-co-butadiene-co-styrene) copolymer, to make a polymer matrix, dry mixing said polymer matrix with amount of an organophilic clay in the range of 5% to 10% by weight; and, extruding said clay-dispersed polymer at temperature in the range between 100 degrees Centigrade and 180 degrees Centigrade.

* * * * *